United States Patent [19]
Petzke et al.

[11] 3,926,179
[45] Dec. 16, 1975

[54] BLOOD PRESSURE MEASURING APPARATUS

[75] Inventors: Jeffrey C. Petzke, Middleton; Dennis E. Bahr, Madison, both of Wis.

[73] Assignee: Wisconsin Alumni Research Foundation, Madison, Wis.

[22] Filed: Apr. 3, 1974

[21] Appl. No.: 457,485

[52] U.S. Cl............ 128/2.05 N; 73/80; 128/2.05 P
[51] Int. Cl.²........................................... A61B 5/02
[58] Field of Search.... 128/2.05 N, 2.05 M, 2.05 A, 128/2.05 E, 2.05 P, 2.05 T, 2.06 F, 2 T; 73/80

[56] References Cited
UNITED STATES PATENTS

| | | | |
|---|---|---|---|
| 2,836,173 | 5/1958 | Uemura et al. | 128/2.05 N |
| 3,070,087 | 12/1962 | Sittel | 128/2 T |
| 3,102,534 | 9/1963 | Bigliano et al. | 128/2.05 N |
| 3,123,068 | 3/1964 | Bigliano | 128/2.05 N |
| 3,224,435 | 12/1965 | Traite | 128/2.05 M |
| 3,605,723 | 9/1971 | King et al. | 128/2.05 M |

*Primary Examiner*—Kyle L. Howell
*Attorney, Agent, or Firm*—Burmeister, Palmatier & Hamby

[57] ABSTRACT

This invention provides apparatus for accurately measuring and continuously monitoring blood pressure. The apparatus comprises a blood pressure probe adapted to engage a body member such as one arm of the patient. The probe includes a pressure applying member for engaging the surface of the body member, over an artery which is near the surface. For example, the pressure applying member may be located over the radial artery in the wrist of the patient's arm. The probe also includes pressure exerting means, such as a solenoid, for pressing the pressure applying member against the surface of the body member, so as to produce partial flattening of the artery. The pressure applying member includes a pressure sensor adapted to engage the surface of the body member over the artery for sensing the blood pressure pulses in the artery. The sensor includes a transducer for producing electrical signals corresponding to the blood pressure pulses. The apparatus includes control means for operating the pressure exerting means to maximize the electrical signals corresponding to the pulse pressure. For example, a feedback circuit may be provided to energize the solenoid to such an extent as to maximize the pulse pressure signals. Generally, the signals will be maximized when the artery is flattened approximately halfway. The true or corrected waveform of the blood pressure signals may be derived and displayed on an oscilloscope for continuously monitoring the blood pressure variations. Means may also be provided for deriving and indicating the systolic and diastolic blood pressure values, and also the pulse pressure. The blood pressure measuring apparatus is highly accurate, continuous in operation, and noninvasive, in that it is not necessary to invade the artery. Moreover, the function of the artery is not impaired, since the device is nonocclusive. The blood pressure probe, together with the supporting apparatus, is called a tonometer.

11 Claims, 12 Drawing Figures

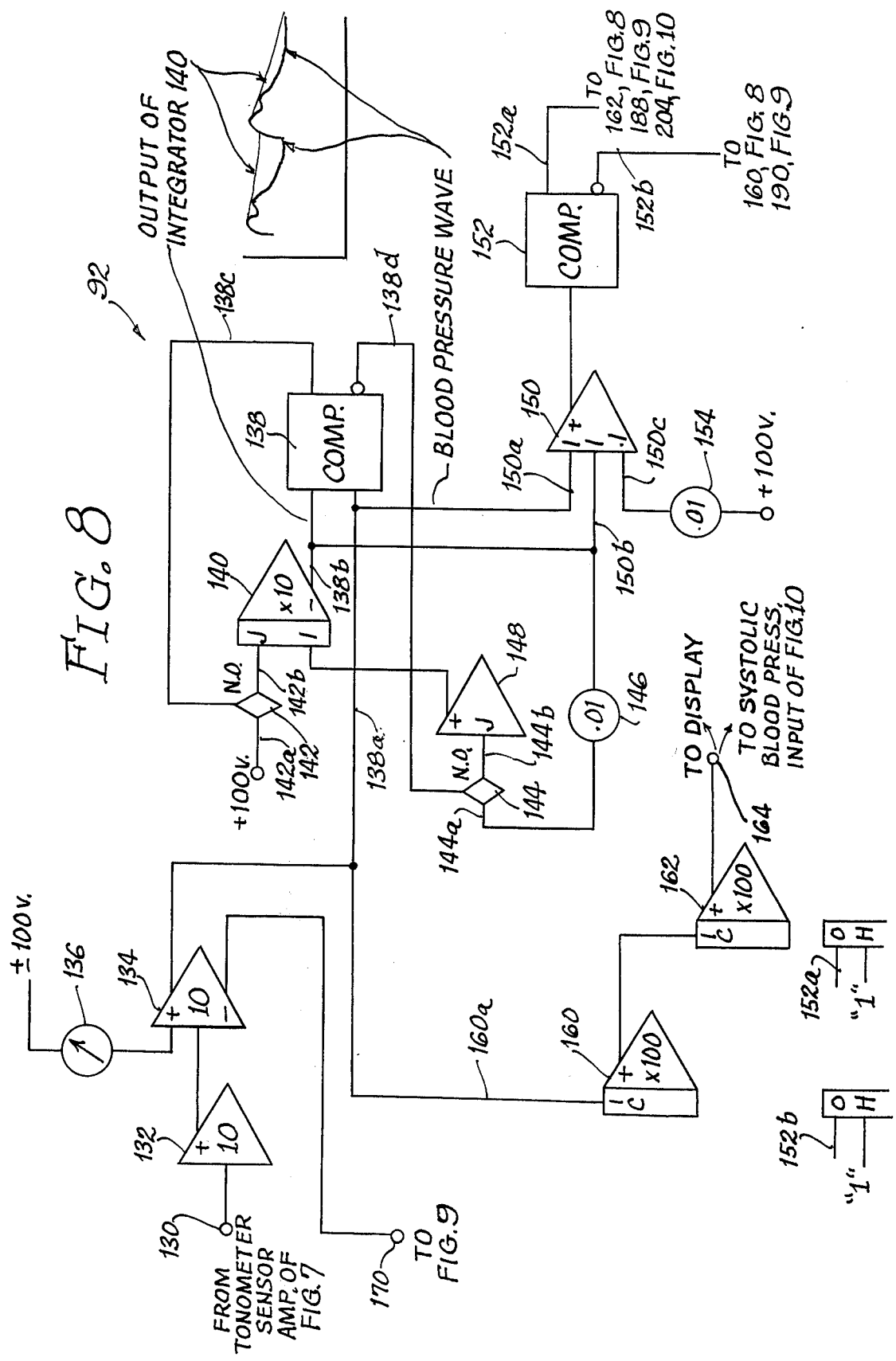

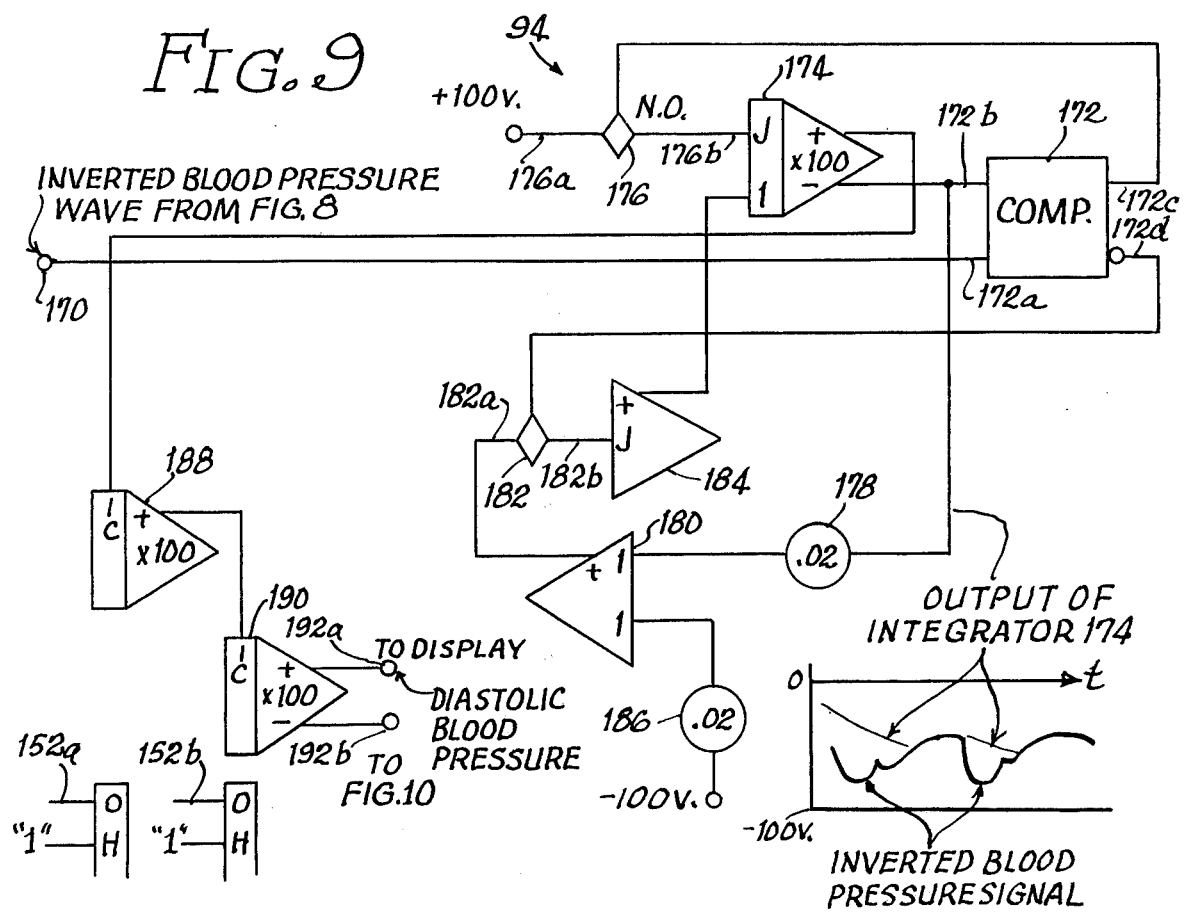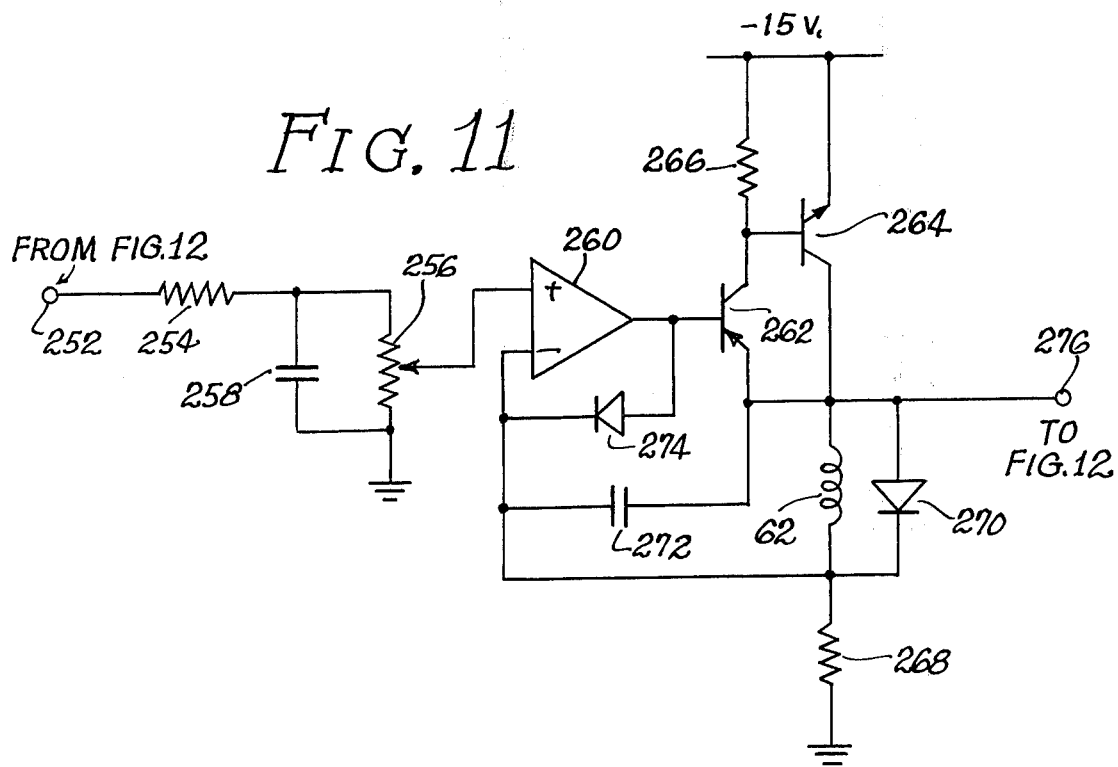

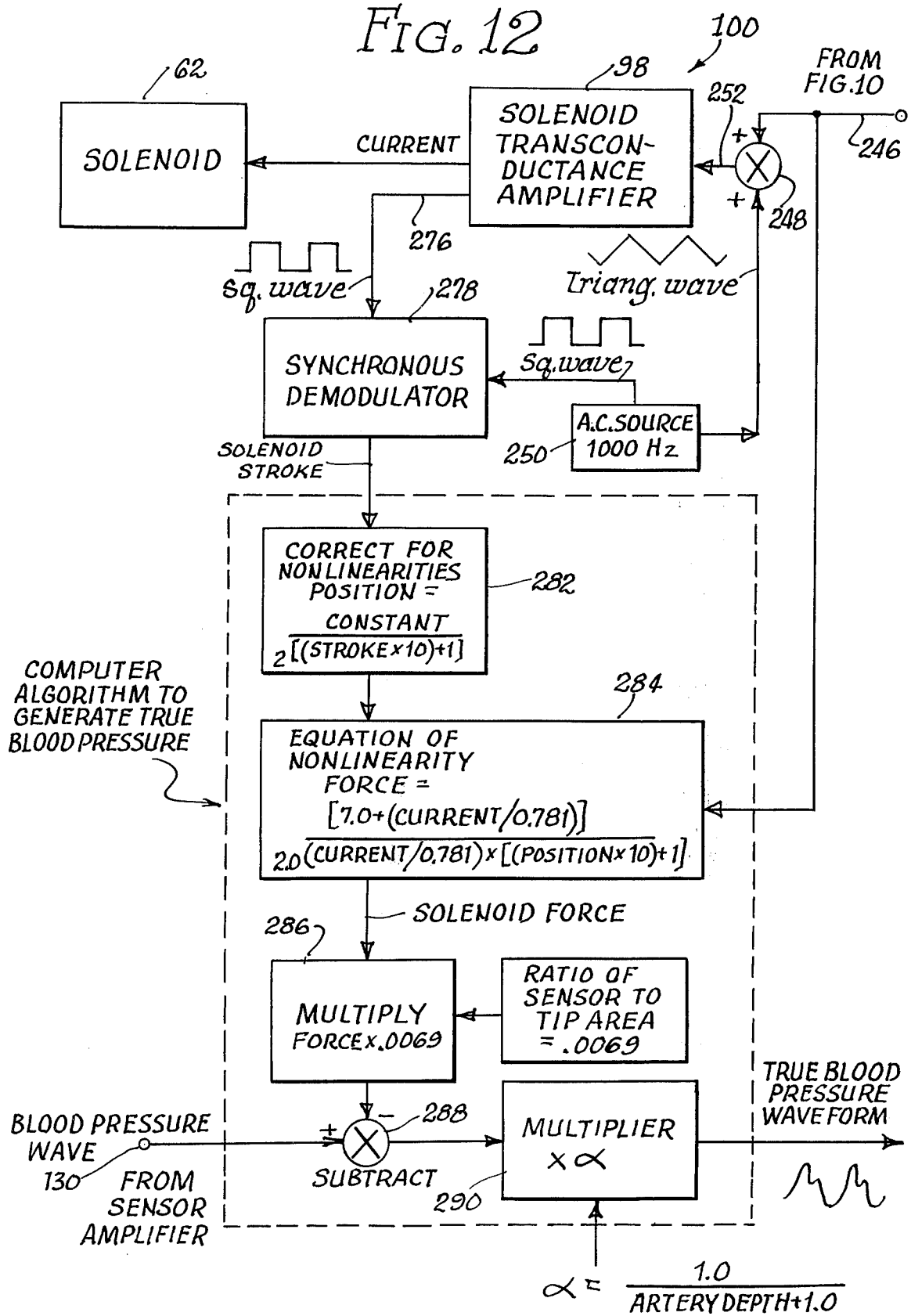

BLOOD PRESSURE MEASURING APPARATUS

This invention relates to the continuous measurement of the blood pressure in an artery which runs close to the surface of a body member, such as one arm or leg of a patient.

One object of the present invention is to provide a blood pressure measuring apparatus or system which is highly accurate and is capable of measuring blood pressure continuously and instantaneously. Thus, the apparatus of the present invention produces electrical signals which correspond instantaneously with the variations in the blood pressure in the artery. These signals can be displayed on an oscilloscope or recorded on a recording oscillograph.

A further object is to provide a blood pressure measuring apparatus or system which does not impair the functioning of the artery and is not invasive, in that the apparatus does not invade the artery in any way. There have been prior systems in which it has been necessary to insert a pressure probe into an artery through a surgical incision.

To achieve these objects, the present invention preferably provides apparatus for measuring the blood pressure in an artery near the surface of an arm, leg or other body member, utilizing a blood pressure probe for engaging the body member. Such probe includes a pressure applying member for engaging the surface of the body member over the artery. The probe also preferably comprises pressure exerting means for pressing the pressure applying member against the surface of the body member to produce a degree of flattening of the artery. A pressure sensor is provided on the probe to engage the surface of the body over the artery to sense the blood pressure pulses in the artery. The sensor may be carried by the pressure applying member. The sensor preferably includes a transducer which produces electrical signals corresponding to such blood pressure pulses. The apparatus provides control means for operating the pressure exerting means to maximize the alternating component of such electrical signals.

The pressure exerting means may take the form of a solenoid, or some other power operated device, which can be energized to a variable extent so as to vary the pressure exerted between the pressure applying member and the body member. In this way, the degree to which the artery is flattened can be varied. It has been found that the pressure pulse signals are maximized when the artery is flattened to a particular extent, generally approximately halfway. With the artery thus compressed, the pressure felt by the sensor corresponds closely to the actual instantaneous blood pressure in the artery.

Means may be provided to make minor corrections in the blood pressure signals, to allow for variations in the depth of the artery below the body surface, and variations in the force exerted by the solenoid. The corrected or true blood pressure wave may then be displayed on an oscilloscope, or recorded on a recording oscillograph. Means may also be provided to derive and indicate the systolic and diastolic blood pressure values, and also the pulse pressure.

The apparatus preferably utilizes a feedback circuit for adjusting the energization of the solenoid so as to maximize the blood pressure signals.

Further objects, advantages and features of the present invention will appear from the following description, taken with the accompanying drawings, in which:

FIG. 3 is a fragmentary longitudinal section, taken along a section plane at right angles to the section plane of FIG. 2, generally as indicated by the line 3—3 in FIG. 1.

FIG. 4 is a fragmentary longitudinal section, similar to the lower portion of FIG. 1, but with the pressure exerting member of the probe in an active position in which it exerts pressure against the surface of the body so as to bring about a partial flattening of the artery.

FIG. 5 is a greatly enlarged, somewhat diagrammatic plan view of a sensor diaphragm employed in the probe to sense the blood pressure pulses in the artery.

FIG. 6 is an enlarged section taken through the diaphragm and showing in an exaggerated fashion the manner in which the diaphragm is deflected by the blood pressure pulses.

FIG. 7 is a schematic circuit diagram showing a sensor amplifier for amplifying the electrical signals produced by the transducer which is incorporated into the blood pressure sensor.

FIG. 8 is a schematic circuit diagram showing electrical circuits for deriving an output signal corresponding to the systolic blood pressure.

FIG. 9 is a schematic circuit diagram showing additional electrical circuits for deriving an output signal corresponding to the diastolic blood pressure.

FIG. 11 is a schematic circuit diagram showing a transconductance amplifier for driving the solenoid.

FIG. 12 is a block diagram showing the arrangement of digital computer components for correcting the blood pressure signals to compensate for variations in the depth of the artery below the body surface, and also variations in the pressure developed by the solenoid.

Figure 1:
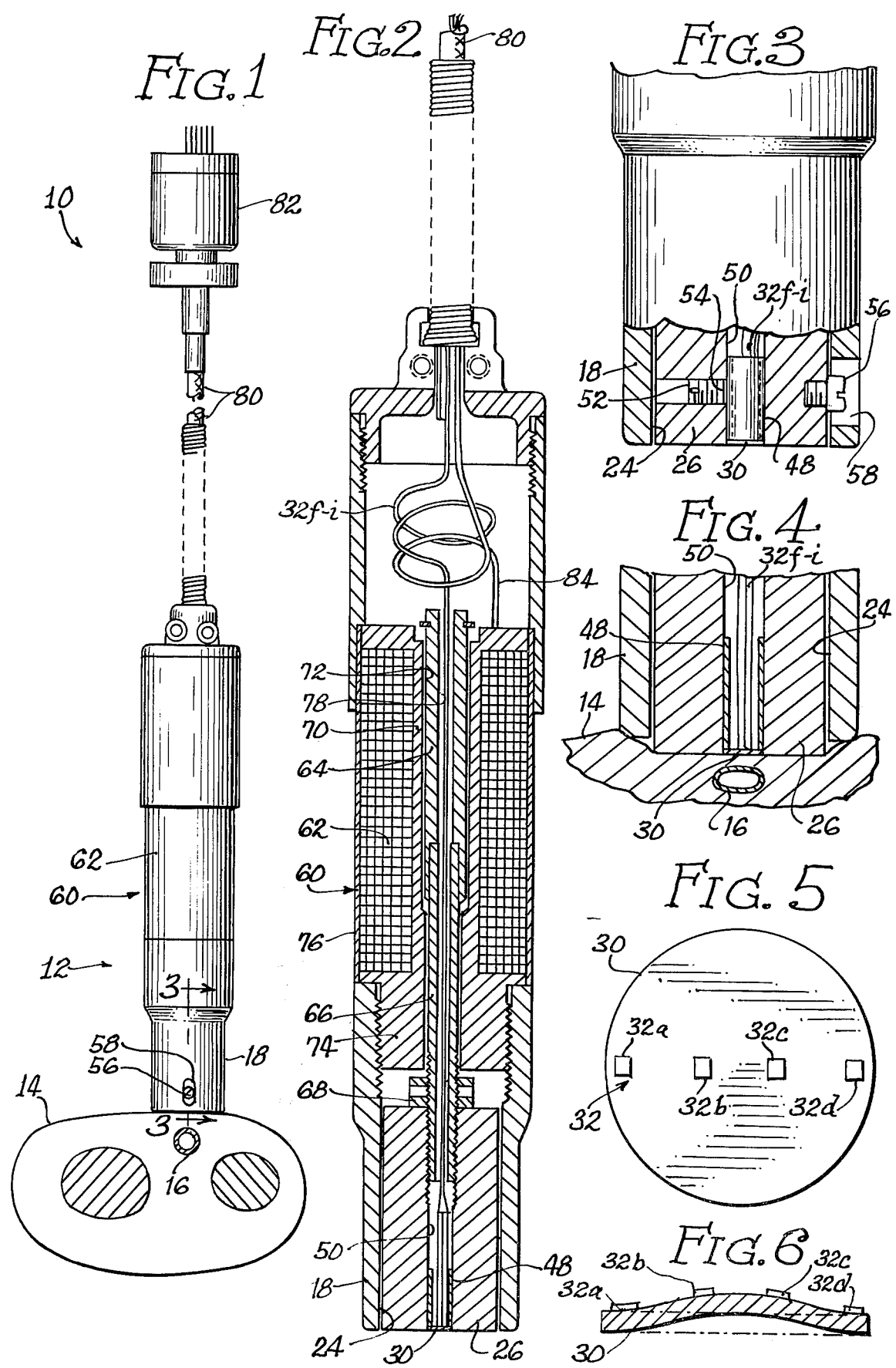
FIG. 1 is an elevational view, partly in section, showing a blood pressure probe constituting one component of a blood pressure measuring system to be described as an illustrative embodiment of the present invention.

As just indicated, the drawings illustrate blood pressure measuring apparatus 10, including a probe 12, adapted to be used in connection with an arm, leg or other body member of the patient. Thus, FIG. 1 includes a diagrammatic cross section of the wrist 14 of a patient. The apparatus 10 is adapted to measure the blood pressure in an artery 16 which runs close to the surface of the wrist or other body member 14. For example, the artery 16 may be the radial artery in the wrist 14.

The blood pressure probe 12 preferably includes a housing 18 (FIGS. 2-4) which is adapted to be engaged with the body member 14. Ordinarily, the housing 18 is held manually against the body member 14, but the housing may be held in place mechanically, if desired.

In this case, the housing 18 is hollow and generally cylindrical or tubular with a bore or opening 24 therein which opens toward the body member 14. Within the opening 24, the probe 12 preferably comprises a pressure applying member 26, adapted to be pressed against the surface of the body member 14, over the artery 16. The pressure between the pressure member 26 and the body member 14 tends to produce flattening of the artery 16 to a variable degree depending upon the amount of pressure. Such flattening is illustrated in FIG. 4. The pressure applying member 26 is illustrated as a generally cylindrical plunger which is slidable in the opening 24 at the lower end of the housing 18.

The blood pressure probe 12 also preferably comprises a sensor 30 for engaging the surface of the body member 14 over the artery 16. The sensor 30 is generally smaller in width than the diameter of the artery 16, and smaller than the diameter of the pressure applying member 26.

The pressure sensor 30 may assume various forms but is illustrated as a diaphragm adapted to be deflected, relative to the pressure applying member 26, by the blood pressure pulses in the artery 16. Ordinarily, the sensor diaphragm 30 is approximately flush, in its initial state, with the pressure applying member 26.

The sensor diaphragm may be made of a suitable flexible resilient material, such as a thin metal, plastic or ceramic material. The thickness of the diaphragm is ordinarily only a few thousandths of an inch.

When the artery 16 is flattened to some degree by the pressure applying member 26, the blood pressure pulses in the artery 16 are transmitted to the sensor 30, which preferably includes or is connected to a transducer 32, adapted to produce electrical signals corresponding to the pressure pulses. The electrical signals indicate the instantaneous variations of the pressure pulses in the artery 16.

Various constructions may be employed for the transducer 32. As shown, the transducer 32 utilizes four resistance elements 32$a$, $b$, $c$ and $d$, carried by the sensor diaphragm 30. The resistance elements 32$a$–$d$ are insulated from one another, so that each functions separately. If the sensor diaphragm 30 is made of a conductive material, the resistance elements 32$a$–$d$ are also insulated from the diaphragm. As shown, the resistance elements 32$a$–$d$ take the form of thin patches of resistance material, which may be mounted or formed on the diaphragm 30 using integrated circuit techniques.

It will be seen from FIG. 5 that the resistance elements 32$a$ and $d$ are positioned on the diaphragm near its outer margin, while the resistance elements 32$b$ and $c$ are positioned near the center of the diaphragm. When the diaphragm 30 is deflected, as shown in FIG. 6, the resistance elements 32$b$ and $c$ are loaded in tension, while the resistance elements 32$a$ and $d$ are loaded in compression. Thus, the resistance of the resistance elements 32$b$ and $c$ is increased, while the resistance of the elements 32$a$ and $d$ is decreased. It will be understood that the deflection of the diaphragm 30 is exaggerated in FIG. 6, for clarity of illustration.

As shown in FIG. 7, the four resistance elements 32$a$–$d$ may be connected into a bridge circuit 32$e$ having input or power supply leads 32$f$ and $g$, and output or signal leads 32$h$ and $i$. The four resistance elements 32$a$–$d$ are arranged in the bridge 32$e$ so that any deflection of the sensor diaphragm 30 will unbalance the bridge. Thus, as shown, the resistance elements 32$a$ and $b$ are connected in series between the input leads 32$f$ and $g$ to form one leg of the bridge. The other leg is formed by the resistance elements 32$c$ and $d$ which are connected in a separate series circuit between the input leads 32$f$ and $g$. The output or signal leads 32$h$ and $i$ are connected to the alternate junctions of the bridge. Thus, the lead 32$h$ is connected to the junction between the resistance elements 32$a$ and $b$, while the lead 32$i$ is connected to the junction between the resistance elements 32$c$ and $d$. As shown, a fixed resistor 32$j$ of a relatively high value is connected in parallel with the resistance element 32$b$, to balance the bridge should the resistance elements not have identical resistance. This balance resistor 32$j$ is placed across the resistance element which has the highest resistance. The resistor 32$j$ is chosen so as to balance the bridge.

The input leads 32$f$ and $g$ are connected to a stable direct current source 34, to produce currents through the resistance elements 32$a$–$d$. When the diaphragm 30 is deflected by the blood pressure pulses, corresponding signals are produced between the output leads 32$h$ and $i$. These signals vary instantaneously with the variations of the blood pressure, as applied to the diaphragm 30.

The stable voltage source 34 may assume various forms, but is illustrated in FIG. 7 as comprising a zener diode 36 having one side connected to the lead 32$g$. The other side is connected by means of a resistor 38 to a direct current power supply terminal 40, adapted to supply +15 volts, or any other suitable voltage. A filtering capacitor 42 is connected across the zener diode 36. The input lead 32$f$ of the bridge circuit 32$a$ is connected to the junction between voltage divider resistors 44 and 46, which are connected in series across the zener diode 36. Thus, the bridge circuit 32$e$ is supplied with a fixed fraction of the stable voltage across the zener diode 36. Further details of the circuits illustrated in FIG. 7 will be described presently.

Figure 2:
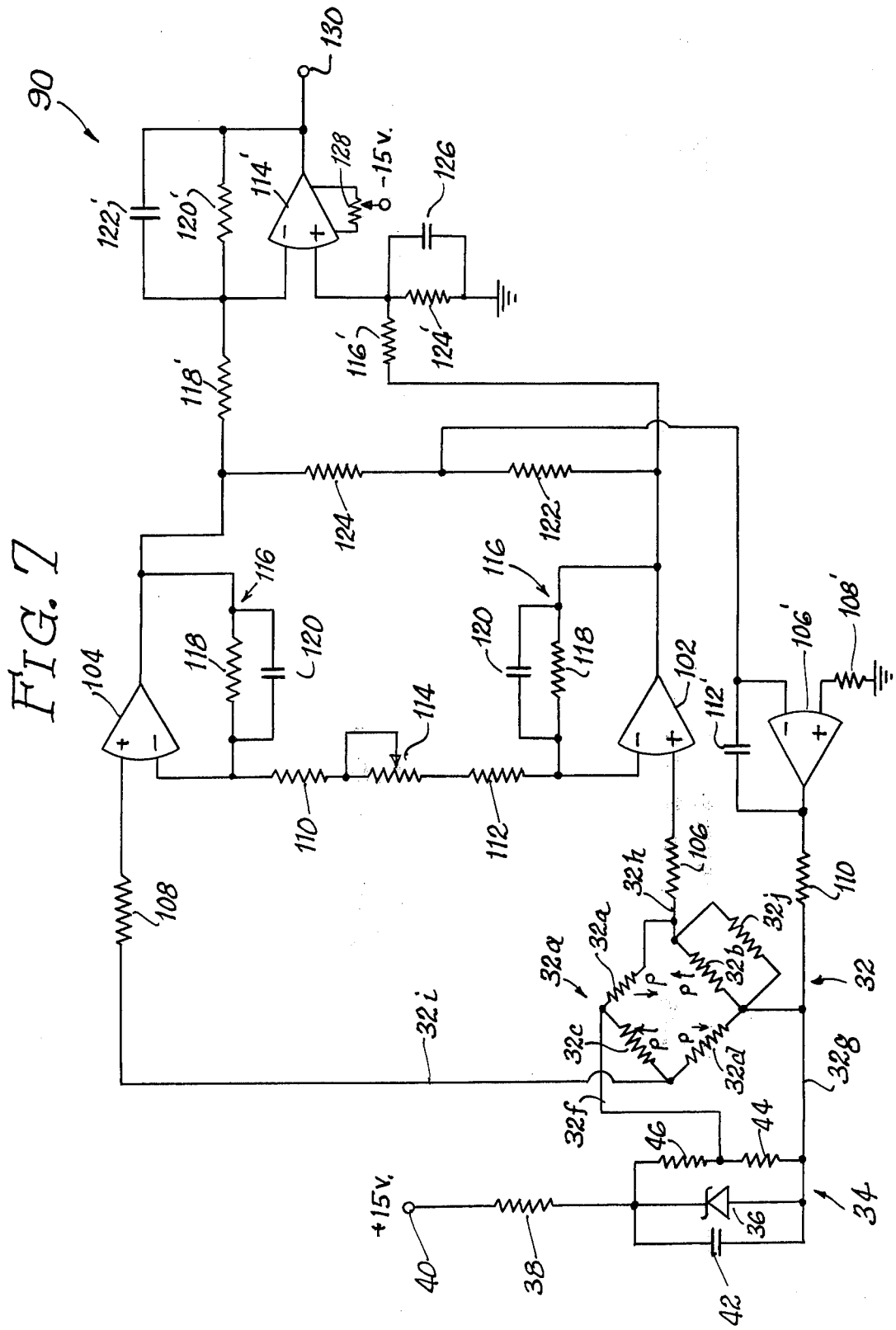
FIG. 2 is an enlarged longitudinal section taken through the blood pressure probe.

Additional details of the probe 10 are shown in FIGS. 2–4. The illustrated sensor diaphragm 30 is mounted on or formed integrally with the lower end of a tube 48, received in an axial bore 50, formed in the pressure applying member 26. The tube 48 may be retained in the bore 50 by means of a set screw 52. A soft resilient disc or pad 54 is preferably interposed between the set screw 52 and the tube 48. The pad 54 may be made of synthetic rubber or the like.

As previously indicated, the pressure applying member 26 is generally cylindrical and is slidable in the bore or opening 24, formed in the housing 18. The pressure applying member 26 is prevented from rotating, relative to the housing 18, by a guide element, shown in FIG. 3 as a guide screw 56, carried by the pressure applying member 26 and freely slidable within a slot or opening 58, formed in the housing 18. The ends of the slot 58 also limit the axial sliding movement of the pressure applying member 26, and prevent it from falling out of the opening 24.

The blood pressure probe 12 preferably includes pressure exerting means 60 for exerting a variable amount of pressure between the pressure applying member 26 and the body member 14 of the patient. Thus, the pressure exerting means 60 may utilize a solenoid or magnetic coil 62, or some other power operated device, capable of exerting pressure against the pressure applying member 26. As shown, the solenoid 62 has a movable armature or core 64, connected to the pressure applying member 26 by any suitable means, such as the illustrated tube 66, which is externally threaded and is screwed into the pressure applying member 26, to afford an adjustable connection. A lock nut 68 is mounted on the threaded tube 66 and is adapted to be clamped against the pressure applying member 26, to prevent any accidental change in the adjustment thereof.

The illustrated solenoid coil 62 is mounted on a tubular spool 70 having a bore 72 within which the armature or core 64 is slidable. The spool 70 has an end member 74 which is screwed into or otherwise secured to the housing 18. An enclosure or shell 76 may be mounted around the solenoid 62.

It will be seen from FIG. 3 that the sensor leads 32*f–i* extend along an axial opening 78 formed in the armature 64. The leads 32*f–i* then extend within the connecting tube 66 and into the bore 50 within the pressure applying member 26. The leads 32*f–i* then extend within the tube 48 to the sensor diaphragm 30.

After emerging from the armature 64 of the solenoid 62, the sensor leads 32*f–i* pass along a cable 80 to a connector 82 (FIG. 1). The cable 80 also includes leads 84 which extend between the solenoid 62 and the connector 82.

The energization of the solenoid 62 can be varied so as to control the pressure which is exerted between the pressure applying member 26 and the body member 14 of the patient. It has been found that the magnitude of this applied pressure affects the magnitude of the electrical signals produced by the blood pressure transducer 32, in response to the blood pressure pulses. The magnitude of the electrical signals, representing the blood pressure pulses, increases as the applied pressure is increased, up to a certain level, above which any further increase in the applied pressure causes the pulse pressure signals to decrease.

The pressure exerted by the solenoid 62 causes partial flattening of the artery 16, as illustrated in FIG. 4. It has been found that the blood pressure pulse signals are maximized when the artery is flattened approximately halfway. Maximizing the blood pressure pulse signals has the advantageous result of standardizing them. Thus, the present invention preferably includes means for controlling the force exerted by the solenoid 62 so as to maximize the blood pressure pulse signals.

In addition to maximizing the blood pressure signals, the partial flattening of the artery 16 has the advantage of producing a situation in which the circumferential tension in the elastic wall of the artery 16 is acting in a direction which is perpendicular to the radial pulses of the blood pressure as applied to the sensor diaphragm 30, so that such circumferential tension does not cause inaccuracies in the magnitude of the pulse pressure.

The output signals from the blood pressure transducer 32 may be supplied to an oscilloscope or a recording oscillograph, to display or record the waveform of the blood pressure pulses. However, it is preferred to utilize electrical control means for amplifying and processing the blood pressure signals, and for controlling the energization of the solenoid 62.

Thus, FIG. 7 illustrates a sensor amplifier 90 for amplifying the blood pressure pulse signals. FIG. 8 illustrates electrical processing circuits 92 for deriving an output voltage or signal which is a continuous measure of the systolic blood pressure.

FIG. 9 illustrates additional electrical control circuits 94 which derive another output voltage or signal to indicate the diastolic blood pressure.

Figure 10:
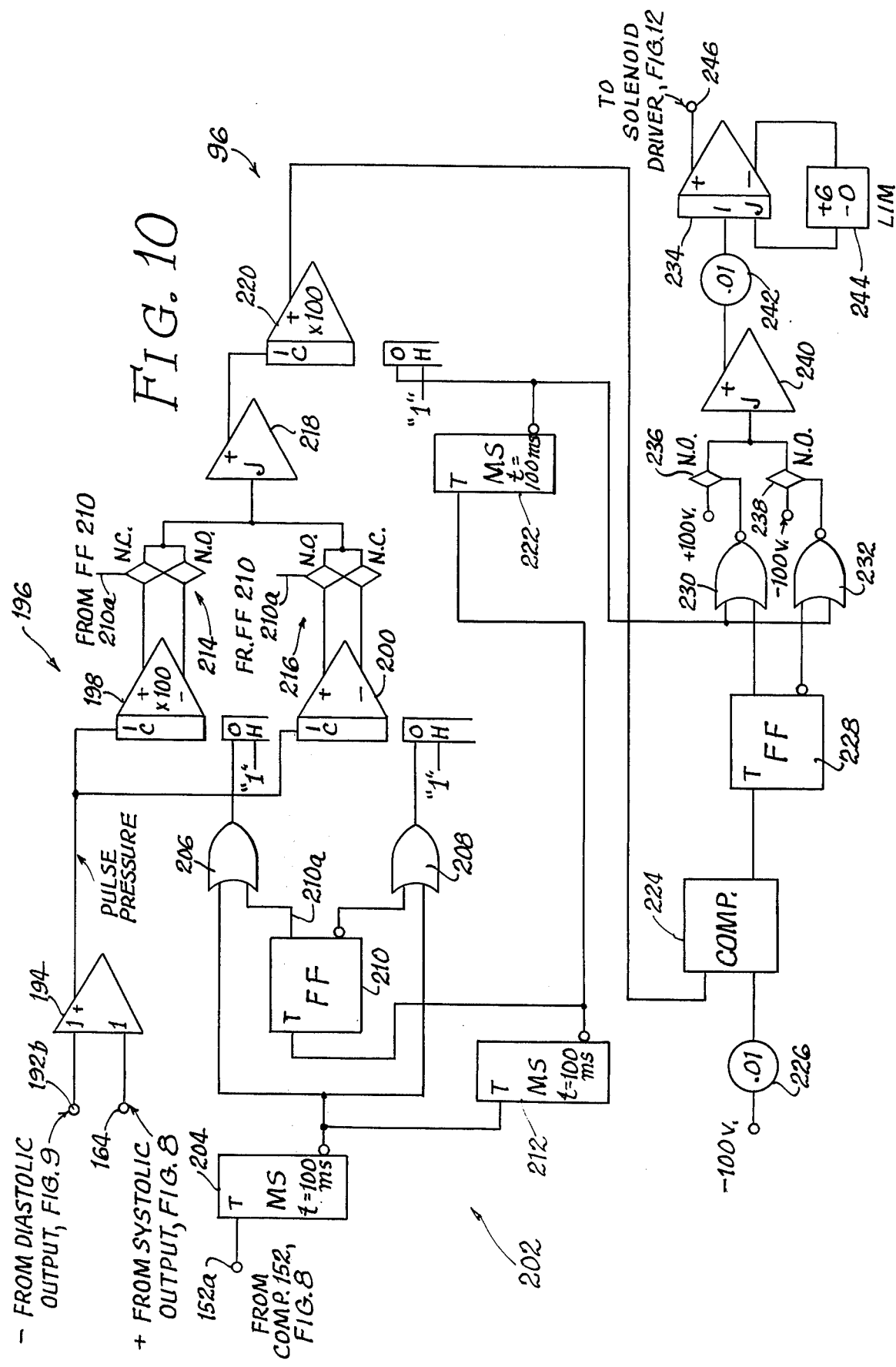
FIG. 10 is a schematic circuit diagram showing electrical circuits for deriving an output signal to vary the energization of the solenoid so as to maximize the pulse pressure signals.

FIG. 10 illustrates electrical control circuits 96 which control the energization of the solenoid 62 so as to maximize the pulse pressure component of the blood pressure signals. FIG. 11 illustrates a transconductance amplifier circuit 98 for driving the solenoid from the output of the circuit 96 shown in FIG. 10.

FIG. 12 illustrates an electrical control arrangement 100 for processing the blood pressure signals, to correct for certain errors so that the blood pressure signals will closely correspond to the true blood pressure. The corrected signals can then be displayed on an oscilloscope or recorded on an oscillograph, so as to shown the true blood pressure waveform. The control arrangement 100 of FIG. 12 compensates for variations in the force exerted by the solenoid 62, while also correcting for the nonlinearity in the relationship between the energizing current in the solenoid, the solenoid stroke and the force developed by the solenoid. A correction is also made to compensate for variations in the depth of the artery, below the body surface of the patient.

THe blood pressure measuring probe, with its supporting apparatus, is called a tonometer.

It will be understood that the details of the sensor amplifier 90, as shown in FIG. 7, may be varied. As illustrated, the sensor amplifier circuit 90 utilizes two precision monolithic operational amplifiers 102 and 104, employed as input devices. One output lead 32*h* of the bridge circuit 32*e* is connected through a resistor 106 to the plus input of the operational amplifier 102, while the other output lead 32*i* is connected through a similar resistor 108 to the plus input of the other operational amplifier 104. Two fixed resistors 110 and 112 and a variable resistor 114 are connected in series between the minus inputs of the operational amplifiers 102 and 104.

A negative feedback path 116 is provided for each of the amplifiers 102 and 104, and is connected between the output and the minus input thereof. In each case, the feedback path 116 comprises a resistor 118 in parallel with a capacitor 120.

It will be seen that output resistors 122 and 124 are connected in series between the output of the operational amplifiers 102 and 104. In this case, the junction between the resistors 122 and 124 is connected to the minus input of another operational amplifier 106', employed as a feedback amplifier. The plus input of the amplifier 106' is connected to ground through a resistor 108'. The output of the feedback amplifier 106' is connected to the input lead 32*g* of the bridge curcuit 32*e*, through a resistor 110'. A small feedback capacitor 112' is connected between the output of the amplifier 106' and the minus input.

The feedback amplifier 106' has the effect of bringing the voltage at its minus input to 0 or nearly so. The minus input is connected to the junction between the output resistors 122 and 124. Thus, inasmuch as this junction is brought to 0 voltage, the feedback amplifier 106' has the effect of balancing the outputs of the amplifiers 102 and 104, with respect to ground. The feedback amplifier 106' achieves this result by supplying a negative output voltage to the input lead 32*g* of the bridge circuit 32*e*. Such negative voltage is equal in magnitude but opposite in sign to the positive voltage supplied to the other input lead 32*f*. Thus, for example, if the input lead 32*f* is supplied with +1.4 volts, the other input lead 32*g* will be supplied with −1.4 volts by the feedback amplifier 106'. The purpose of this arrangement is to increase the common mode rejection ratio (CMRR) of amplifier 114.

Another operational amplifier 114' is connected to the output resistors 122 and 124 to combine the outputs of the operational amplifiers 102 and 104. Thus, the outputs of the amplifiers 102 and 104 are connected through resistors 116' and 118' to the plus and minus inputs, respectivley, of the amplifier 114'. A negative feedback resistor 120' is connected between the output and the minus input of the amplifier 114'. A capacitor 122' is connected in parallel with the resistor 120'. To balance the inputs, a similar resistor 124' and a similar capacitor 126 are connected between the plus input and ground.

A trimming potentiometer 128 is connected to the amplifier 114' so that the initial or offset output voltage can be adjusted. Typically, the offset output voltage is adjusted to 0, so that the output voltage goes positive with increasing blood pressure. The amplifier can be accurately calibrated so that a particular blood pressure produces a particular value of output voltage. For example, the calibration may be such that an output voltage of 1 volt represents a blood pressure value of 400 millimeters of mercury.

The output of the operational amplifier 114 goes to an output terminal 130 at which the blood pressure output signal or wave appears. The output terminal 130 is also shown in FIGS. 8 and 12.

As previously indicated, FIG. 8 illustrates the circuits 92 for deriving a signal or voltage which corresponds to the systolic blood pressure. In the illustrated circuit, the blood pressure signal from the output terminal 130 is fed to the input of an amplifier 132, having its positive output connected to the input of a second amplifier 134. These two amplifiers raise the full-scale output level from approximately 1 volt to 100 volts, for compatibility with the subsequent analog computer elements. Each of the amplifiers 132 and 134 may have a gain of 10, as indicated by the number within the amplifier block.

A variable offset control voltage is supplied to the amplifier 134 by a variable potentiometer 136 which has a plus or minus 100 volt input. By adjusting the potentiometer 136, it is possible to introduce either a positive or negative offset into the output of the amplifier 134, to compensate for varying conditions in the blood pressure probe.

The amplified blood pressure wave appears at the positive output of the amplifier 134 and is supplied to one input of a comparator 138, such input being designated 138a. The other input 138b is connected to the minus output of an integrator 140.

The comparator 138 has logic outputs 138c and d which are normally in logical "1" and "0" states. When the comparator 138 flips, these logic states are interchanged.

The output 138c of the comparator is connected to the control input of an electronic switch 142 having its signal input 142a connected to +100 volts. The signal output line 142b of the switch 142 is connected to the summing junction input of the integrator 140.

When the blood pressure signal on the input line 138a exceeds the voltage on the input line 138b, the switch 142 is turned on so that the +100 volt signal is connected to the integrator 140. Thus, the output of the integrator rises rapidly to the level of the blood pressure signal. If the output of the integrator 140 exceeds the blood pressure signal, the comparator 138 flips, with the result that the switch 142 is turned off and switch 144 is turned on. As the blood pressure signal rises rapidly to its systolic value, the output of the integrator 140 tracks the rising blood pressure signal rather closely. Generally, the comparator 138 flips back and forth rather rapidly during this portion of the blood pressure signal, so that the integration is accomplished in a series of small steps.

When the blood pressure signal drops down from its systolic peak, the comparator 138 flips so that the switch 142 is turned off. Thus, the integration ceases.

It will be seen that the second output 138d of the comparator is connected to the control input of another electronic switch 144 having a signal input line 144a and a signal output line 144b. The minus output of the integrator 140 is connected to the signal input 144a through a potentiometer 146 which reduces the signal leve. The potentiometer 146 may be set at a level of 0.01, as indicated by the figures within the block. The output line 144b is connected to the summing junction input of an amplifier 148, having its positive output connected to the input of the integrator 140. The amplifier 148 acts as a buffer to provide a summing junction input which is needed for the switch 144. The effect of this feedback loop between the minus output of the integrator 140 and the input of the integrator is to cause an exponential decay in the output of the integrator, after it stops integrating. This exponential decay starts when the comparator 138 flips. The provision of the exponential decay insures that the integrator 140 will track upwardly along the rising portion of each successive systolic blood pressure pulse. Thus, the integrator 140 stops integrating upward at each systolic peak. The output of the integrator then decays exponentially so that the integrator will be receptive to the next systolic peak.

The inputs 138a and 138b of the comparator 138 are connected to the inputs of a summing amplifier 150 having its output connected to the input of a second comparator 152. The inputs of the amplifier 150 are designated 150a and 150b, to correspond with the inputs 138a and 138b. A small offset is introduced into the input of the amplifier 150 by connecting a third input 150c through a potentiometer 154 to +100 volts. As indicated by the figures on the block, the setting of the potentiometer 154 may be 0.01, so that the potentiometer supplies 1 volt.

As long as the blood pressure signal on the input 150a is greater than or equal to the integrator output voltage on the input 150b, the comparator 152 does not flip. Due to the offset provided by the signal from the potentiometer 154, the blood pressure signal on the input line 150a has to drop a definite amount, such as 1 volt, or 1 percent of full scale below the integrator output before the comparator 152 is caused to flip. This offset prevents the comparator 152 from flipping during the step integration, when the comparator 138 flips repeatedly. Thus, the comparator 152 is caused to flip when the blood pressure signal passes its systolic peak and drops downwardly a definite amount, such as 1 volt or 1 percent of full scale. This minimal drop is insignificant and can be compensated for elsewhere in the circuit.

The comparator 152 has logic output lines 152a and b which are employed to trigger sampling devices, as will be indicated in detail presently.

The circuit 92 of FIG. 8 comprises two successive sampling integrators 160 and 162. The output line 152a of the comparator 152 is connected to the operating input O of the sampling integrator 162. The other output line 152b is connected to the operating input O of the sampling integrator 160.

It will be seen that the initial condition input 160a of the sampling integrator 160 is connected to the plus output on the amplifier 134, and thus is supplied with the blood pressure signal. During the rising portion of each systolic peak, the initial condition input follows the blood pressure signal upwardly. Just after the peak, the comparator 152 flips, causing the sampling integrator 160 to hold, because the hold input is held at a state of "1" at all times. Thus, the integrator 160 holds the systolic peak voltage.

The plus output of the sampling integrator 160 is connected to the initial condition input of the sampling integrator 162. Thus, the systolic blood pressure voltage is transferred to the integrator 162. When the comparator 152 flips back, during the next systolic rise of the blood pressure signal, the sampling integrator 162 goes on hold, so that the systolic blood pressure signal is captured by the integrator 162.

The plus output of the second sampling integrator 162 goes to a systolic blood pressure output terminal 164, which may be connected to a display device, such as an oscilloscope, a recording oscillograph, or any suitable voltage indicator. The systolic blood pressure output terminal 164 is also connected to the circuit 96 of FIG. 10, as will be described in detail presently.

As previously indicated, FIG. 9 illustrates the electronic circuits 94 for producing a signal corresponding to the diastolic blood pressure. It will be seen that the circuit 94 has an input terminal 170 which is connected to the minus output of the amplifier 134 of FIG. 8, and thus is supplied with the inverted blood pressure wave or signal. The inversion converts the diastolic valley into a peak which can be tracked with circuits similar to those employed in tracking the systolic peak.

Thus, the input terminal 170 is connected to one input of a comparator 172 having analog inputs 172a and b and logical outputs 172c and d. The input 172a is connected to the input terminal 170 and thus is supplied with the inverted blood pressure waves. The input 172b is connected to the minus output of an integrator 174.

The output 172c of the comparator 172 is connected to the control input of an electronic switch 176 having a signal input line 176a connected to +100 volts, and a signal output line 176b connected to the summing junction input of the integrator 174.

The comparator 172 causes the integrator 174 to track the diastolic peak of the inverted blood pressure wave, in the same manner as the comparator 138 causes the integrator 140 to track the systolic peak, as described in connection with FIG. 3. When the diastolic peak rises above the output of the integrator 174, the comparator 172 flips, so as to prevent further integration until the next cycle of the blood pressure wave.

To cause the output of the integrator 174 to decay exponentially, a feedback loop is connected between the minus output of the integrator 174 and the input circuit. Such feedback loop includes a potentiometer 178 connected between the minus output of the integrator 174 and the input of an amplifier 180, having its plus output connected to the signal input 182a of an electronic switch 182. The signal output 182a of the switch 182 is connected to the summing junction input of a buffer amplifier 184, having its plus output connected to the input of the integrator 174. The second output 172d of the comparator 172 is connected through the control input of the electronic switch 182.

When the comparator 172 flips, due to the dropping of the diastolic peak of the inverted blood pressure wave below the minus output of the integrator 174, the electronic switch 182 is turned on, so that the feedback loop is completed. The output of the integrator 174 is thus caused to decay exponentially.

A potentiometer 186 is connected between −100 volts and a second input of the amplifier 180, to introduce an offset, since the circuit must decay to −100 volts and integrate to 0 volts.

The diastolic signal circuit 94 of FIG. 9 also includes two successive sampling integrators 188 and 190, arranged much the same as the integrators 160 and 162 of FIG. 8. The integrators 188 and 190 are triggered between holding and operating states by the output signals from the comparator 152 of FIG. 8. Thus, the output line 152a of the comparator 152 is connected to the operating input terminal of the sampling integrator 188 of FIG. 9. The other comparator output line 152b is connected to the operating input terminal of the sampling integrator 190.

It will be seen that the initial condition input of the integrator 188 is connected to the plus output of the integrator 174. The plus output of the sampling integrator 188 is connected to the initial condition input of the sampling integrator 190.

The sampling integrator 188 tracks the plus output of the integrator 174 as it follows the diastolic peak of the inverted blood pressure wave. The sampling integrator 188 goes to a holding condition when the comparator 152 flips back at the beginning of the next systolic rise. This is close to the diastolic peak of the inverted waveform, so that very little decay has occured in the output signal from the integrator 174. Thus, the sampling integrator 188 holds a signal which corresponds very closely to the diastolic peak of the inverted blood pressure wave. This signal is then transferred to the second sampling integrator 190 which goes to a holding state when the comparator 152 flips, just past the systolic peak. The sampling integrator 190 has plus and minus outputs which supply diastolic blood pressure output signals to output terminals 192a and b. It will be understood that either or both of the output terminals 192a and b may be connected to a display device for displaying or indicating the diastolic blood pressure. Such display device may take the form of an oscilloscope, a recording oscillograph, or a suitable voltage indicator. The minus diastolic output from the terminal 192b is also supplied to the circuits 96 of FIG. 10.

The systolic and diastolic blood pressure signals are employed in the circuit 96 of FIG. 10 to derive a signal corresponding to the pulse pressure. For this purpose, the circuits 96 include means for subtracting the diastolic signal from the systolic signal. Such means may include an amplifier 194 used as a subtracting device. The inputs of the amplifier 194 are connected to the systolic pressure signal output terminal 164 and the diastolic output signal terminal 192b. In the amplifier 194, these signals are combined subtractively, so that the output signal from the amplifier represents the pulse pressure.

The pulse pressure signal from tha amplifier 194 is supplied to solenoid control circuits 196, which vary the energization of the solenoid 62 in the blood pressure probe 12 so as to maximize the pulse pressure signal. As illustrated, the solenoid control circuit 196 utilizes a pair of memory devices 198 and 200 which may be in the form of sampling integrators. The initial condition inputs of both devices 198 and 200 are connected to the plus output of the amplifier 194, and thus are supplied with the pulse pressure signal.

The memory devices 198 and 200 are caused to operate alternately, during alternate cycles of the blood pressure wave. Thus, one memory device stores the previous pulse pressure signal, while the other memory device stores the present pulse pressure signal. It is then possible to compare the two stored signals, to determine whether the pulse pressure signal is increasing or decreasing.

Thus, the solenoid control circuit 196 includes a circuit 202 for alternately operating the memory devices 198 and 200, during alternate cycles of the blood pressure wave. The circuit 202 may be triggered by the output signals from the comparator 152 of FIG. 8. Such output signals are timed by the systolic pressure peaks of the successive cycles.

As illustrated, the circuit 202 comprises a monostable 204 having its input connected to the output terminal 152a of the comparator 152. The monostable 204 produces a brief output pulse of a particular duration during each cycle of the blood pressure wave, when the comparator 152 supplies a triggering signal. The duration of the pulse supplied by the monostable 204 may be about 100 milliseconds, as indicated by the figures on the block.

The output of the monostable 204 is supplied to one input of an "OR" gate 206, and also to one input of a second "OR" gate 208. The "OR" gates 206 and 208 have their outputs connected to the operating inputs of the sampling integrators 198 and 200.

To bring about the alternate operation of the sampling integrators 198 and 200, the other inputs of the "OR" gates 206 and 208 are connected to the normal and inverted outputs of a flip-flop 210 having its input connected to the output of a second monostable 212, which is similar to the first monostable 204. The input of the second monostable 212 is connected to the output of the first monostable 204.

Thus, the sampling memory devices 198 and 200 take turns in sampling the present pulse pressure signal and then storing it during the next cycle. The outputs of the memory devices 198 and 200 are combined subtractively, in such a manner that the preceding pulse signal is always subtracted from the present pulse signal.

To achieve this mode of operation, the plus and minus outputs of the memory devices 198 and 200 are commutated by dual electronic switches 214 and 216, each having a normally closed section, designated N.C., and a normally open section, designated N.O. The normally closed section of the switch 214 is connected into the plus output line from the memory device 198, while the normally open section is connected into the minus output line. As to the electronic switch 216, the normally closed section is connected into the minus output line from the memory device 200, while the normally open section is connected to the plus output line. The outputs of all of the switch sections are connected to the junction input of a summing amplifier 218. A difference or error signal appears at the output of the amplifier 218. Such error signal represents the difference between the present blood pressure pulse signal and the preceding pulse signal. If this difference is positive, the pulse signal is rising. If the error signal is negative, the pulse signal is decreasing in magnitude.

The commutating electronic switches 214 and 216 may be triggered by pulses from the flip-flop 210. Thus, the signal inputs of the switches 214 and 216 may be connected to the normal output 210a of the flip-flop 210.

An additional memory device 220 is preferably provided to store the error signal from the amplifier 218. The illustrated memory device 220 takes the form of a sampling integrator having its initial condition input connected to the plus output of the amplifier 218. Pulse signals for the synchronized operation of the memory device 220 may be obtained from the output of a third monostable 222 having its input connected to the output of the second monostable 212.

In the circuit 96 of FIG. 10, the stored error signal from the plus output of the sampling integrator 220 is supplied to one input of a comparator 224 having its other input connected through a potentiometer 226 to −100 volts. The potentiometer 226 may have a low setting, such as 0.01, so as to provide a threshold for the error signal. This threshold eliminates the effect of noise at low error signal levels.

The output of the comparator 224 is connected to the input of a flip-flop 228 which changes its state whenever the output of the comparator 224 changes between positive and negative values of the error signal.

The normal and inverted outputs of the flip-flop 228 are connected to "NOR" gates 230 and 232 which control the action of an integrator 234. When the flip-flop 228 changes states, the direction of integration is reversed.

In the illustrated circuit of FIg. 10, the outputs of the "NOR" gates 230 and 232 are connected to the control inputs of electronic switches 236 and 238. The switch 236 controls a signal path between +100 volts and the junction input of a buffer amplifier 240, having its plus output connected through a potentiometer 242 to the input of the integrator 234. Thus, when the switch 236 is closed, the integrator 234 integrates in a positive direction.

The electronic switch 238 is connected in a signal path between −100 volts and the junction input of the buffer amplifier 240. Accordingly, when the switch 238 is closed, the integrator 234 integrates negatively. The potentiometer 242 may have a low setting, such as 0.01. A limiter 244 may be connected in a feedback path between the minus output of the integrator 234 and the junction input.

In order to conduct the integration on a sampling basis, one input of each of the "NOR" gates 230 and 232 is connected to the output of the monostable 222. Thus, brief pulses are supplied to the gates 230 and 232 to limit the time interval during which integration takes place. This was done so that the integrator 234 is not integrating while the systolic and diastolic measurements are being made.

The plus output of the integrator 234 is connected to an output terminal 246 which also appears in FIG. 12. The transconductance amplifier 98 of FIG. 11 is employed to convert the solenoid signal voltage at the terminal 246 into a corresponding solenoid current. Further details of the amplifier 98 will be given presently.

When the magnitude of the pulse pressure is increasing, the error signal from the integrator 220 is positive. As long as this condition exists, the flip-flop 228 does not change states, so that the integration being performed by the integrator 234 continues in whatever direction is then in effect.

If the pulse pressure starts to decrease, the error signal goes negative, with the result that the flip-flop 228 changes states. Accordingly, the direction of integration is reversed. This will ordinarily cause the pulse pressure to increase again, so that this direction of integration is continued until the pulse pressure starts to fall again. The flip-flop 228 then changes states again, so that the direction of integration is again reversed Thus, the integrator 234 constantly attempts to increase the pulse pressure, so that the pulse pressure is quickly brought to its maximum value and is kept very close to such value. There is a constant stepping of the solenoid current to keep the pulse pressure very near its maximum value.

As previously indicated, FIG. 12 illustrates the circuits 100 for driving the solenoid 62. It will be seen that the output terminal 246, which supplies the solenoid control voltage from the integrator 234, is connected to one input of a summing device 248, having its other input supplied with an alternating current signal from a source 250. Such signal may be at a frequency of 1,000 Hertz, or any other suitable frequency. The waveform is triangular in shape and has an amplitude of a fraction of a volt. The combined output of the summing device 248 is supplied to the input of the solenoid transconductance amplifier or driver 98, the details of which are shown in FIG. 11. The amplifier 98 supplies the energizing current to the solenoid 62.

The transconductance amplifier 98 of FIG. 11 is adapted to convert the voltage input signal into corresponding solenoid current. The amplifier 98 has an input terminal 252 which is also shown in FIG. 12. To adjust the gain, a fixed resistor 254 and a potentiometer 256 are connected in series between the input terminal 252 and ground. A capacitor 258 is connected across the potentiometer 256 to reduce the effect of noise signals.

The slider of the potentiometer 256 may be connected to the plus input of an operational amplifier 260 having its output connected to the base of a first transistor 262, employed to drive a second and larger transistor 264. The collector of the transistor 262 is connected to the pase of the transistor 264. A load resistor 266 is connected between the collector of the transistor 262 and −15 volts, or some other suitable power source. In this case, the emitter of the transistor 264 goes directly to −15 volts.

The collector of the output transistor 264, and also the emitter of the driving transistor 262, are connected to one side of the solenoid 62, which has its other side connected to ground through a low value resistor 268. It will be seen that a back biased diode 270 is connected across the solenoid 62, to reduce inductive surges which might otherwise damage the transistors.

Negative feedback is provided by connecting the minus input of the amplifier 260 to the junction between the solenoid 62 and the resistor 268. Thus, the voltage across the resistor 268 is fed back to the minus input of the amplifier 260. This feedback voltage is proportional to the current through the solenoid 62. Due to this feedback connection, the solenoid current is proportional to the input signal voltage.

To promote stable operation of the circuit, a negative feedback capacitor 272 of small value is connected between the emitter of the transistor 262 and the minus input terminal of the amplifier 260. A negative feedback diode 274 is connected between the output of the amplifier 260 and the minus input. This diode provides negative feedback if the output of the amplifier 260 goes positive, which has the effect of turning off the transistor 262.

It will be seen that an output terminal 276 is connected to the high end of the solenoid 62, to provide an output voltage which is indicative of the stroke or position of the solenoid armature 64. Such voltage is employed in the circuits 100 of FIG. 12. Thus, the output terminal 76 also appears in FIG. 12.

Such output signal, representing the solenoid stroke, is employed in the circuits 100 of FIG. 12 as a factor in correcting the blood pressure signal or wave, so as to compensate for variations in the solenoid current, and also for the nonlinearity of the solenoid.

It will be seen from FIG. 12 that the output terminal 276 is connected to one input of a synchronous demodulator 278, having its other input connected to the output of the alternating current source 250. The synchronous demodulator 278 demodulates the alternating current component of the stroke signal, so that the output of the demodulator 278 provides a direct current signal which is indicative of the solenoid stroke.

In the arrangement of FIG. 12, the output signal from the synchronous demodulator 278 is processed by a digital computer, in accordance with an algorithm 280, enclosed in broken lines. The digital computer algorithm also utilizes the solenoid control signal from the output terminal 246.

The first step in the digital computer algorithm is to correct the stroke signal, derived from the synchronous demodulator 278, so as to compensate for nonlinearities in the solenoid. This computation is represented by the block 282, and is carried out in accordance with the following formula, which gives the position, or corrected stroke, of the solenoid armature, in terms of the uncorrected stroke:

$$\text{POSITION} = \frac{\text{CONSTANT}}{_{2.0}[(\text{stroke} \times 10.0) + 1.0]}$$

In the next step of the digital computer algorithm, represented by the block 284, the corrected stroke or position signal from the block 282 is combined with the signal from the output terminal 246. The latter signal is a voltage which is proportional to the solenoid current. This computation, represented by the block 284, is carried out in accordance with the following formula, in which the force exerted by the solenoid is given in terms of the position signal from the block 282, and the current signal from the output terminal 246:

$$\text{FORCE} = \frac{[7.0 + (\text{current}/0.781)]}{_{2.0}(\text{current}/0.781) \times [(\text{position} \times 10.0) + 1.0]}$$

The result of this computation, represented by the block 284, is a value indicating the force exerted by the solenoid. The next step in the computation, represented by the block 286, is to multiply the force by a factor representing the ratio of the sensor area to the tip area, the tip referred to being the tip of the pressure applying member 26. In the particular case illustrated by FIG. 12, such ratio is 0.0069.

In accordance with the next step in the computation, the resulting value is subtracted from the blood pressure values derived from the signal at the output terminal 130 of the sensor amplifier. This subtraction is represented by the block 288. This computation has the effect of subtracting the exerted pressure from the unprocessed blood pressure values.

The final computation, represented by the block 290 in FIG. 12, involves multiplying the net blood pressure values by a factor alpha to compensate for the depth of the artery 16 below the surface of the body member 14 (FIGS. 1 and 4). As indicated in FIG. 12, the factor alpha is given by the following formula:

$$\text{alpha} = \frac{1.0}{(\text{artery depth} + 1.0)}$$

It will be understood that the subtraction represented by the block 288 and the multiplication represented by the block 290 may be carried out by analog components, if desired. In that case, the factor alpha may simply be a voltage derived from a variable potentiometer.

The output from the block 290 is the true blood pressure waveform, which may be displayed on an oscilloscope or recorded on a recording oscillograph.

Those skilled in the art will understand that the values and the type designations of the various components are subject to wide variations. However, it may be helpful to offer the following table, setting forth one set of suitable component values and type designations:

| Transistors and Diodes | Type | Integrated Circuits | Type |
|---|---|---|---|
| 262 | 2N4126 | 102, 104 | OP-05C |
| 264 | 2N3054 | 106' | 741 |
| 270 | 1N4148 | 114' | 741 |
| 274 | 1N4148 | 260 | 741 |

| Resistors | Ohms |
|---|---|
| 32j | 33K |
| 38 | 2.7K |
| 44 | 2.7K |
| 46 | 2.7K |
| 106 | 10K |
| 108 | 10K |
| 108' | 5K |
| 110 | 1K |
| 110' | 2.4K |
| 112 | 1K |
| 114 | 10K |
| 116', 118' | 5K |
| 118 | 100K |
| 120', 124' | 100K |
| 122, 124 | 10K |
| 128 | 10K |
| 254 | 47K |
| 256 | 10K |
| 266 | 100 |
| 268 | 5 |

| Capacitors | mf or pf |
|---|---|
| 42 | 10 |
| 112' | 100 |
| 120 | .05 |
| 122' | .01 |
| 126 | .01 |
| 258 | .001 |
| 272 | 100 |

We claim:

1. Apparatus for measuring the blood pressure in an artery near the surface of a body member, comprising a blood pressure probe having a housing for engaging the body member,
said probe including a pressure applying member movably mounted in said housing for engaging the surface of the body member over said artery,
power operated pressure exerting means on said probe for pressing said pressure applying member against the surface of said body member to produce a degree of flattening of said artery,
a sensor in said pressure applying member for engaging the surface of said body member over said artery to sense the pressure pulses in said artery,
said sensor including a transducer for producing electrical signals corresponding to said pressure pulses,
and control means having an input circuit for receiving said electrical signals and power output regulating means connected to said pressure exerting means and responsive to said electrical signals for operating said pressure exerting means in a variable manner to maximize said electrical signals corresponding to said pressure pulses.

2. Apparatus according to claim 1,
in which said pressure applying member is formed with an opening,
said sensor being mounted in said opening for responding to the pressure pulses in said artery.

3. Apparatus according to claim 1,
in which said pressure exerting means comprises a solenoid for exerting a variable amount of force on said pressure applying member.

4. Apparatus according to claim 3,
in which said control means comprises a feedback circuit for receiving said electrical signals and energizing said solenoid to maximize such electrical signals.

5. Apparatus according to claim 1,
in which said control means includes a feedback circuit for receiving said electrical signals and energizing said power operated pressure exerting means to maximize said signals.

6. Apparatus according to claim 5,
including measuring means for indicating the values of said electrical signals.

7. Apparatus according to claim 1,
including measuring means for indicating the values of said electrical signals.

8. Apparatus according to claim 1,
said housing having an opening therein,
said pressure applying member being disposed in said opening and being movable therein for engagement with the surface of said body member.

9. Apparatus according to claim 1,
in which said pressure exerting means is connected between said housing and said pressure applying member for exerting force upon said pressure applying member for transmission to the body member.

10. Apparatus according to claim 1, in which said pressure exerting means is mounted on said housing and is connected to said pressure applying member for exerting pressure thereon.

11. Apparatus according to claim 1,
in which said power operated pressure exerting means comprises a solenoid for exerting variable pressure upon said pressure applying member for transmission to the body member.

* * * * *